March 22, 1960  SHAFI-UDDIN A. CHOUDHURY  2,929,977
DYNAMIC BRAKING OF INDUCTION MOTORS
Filed Sept. 26, 1958
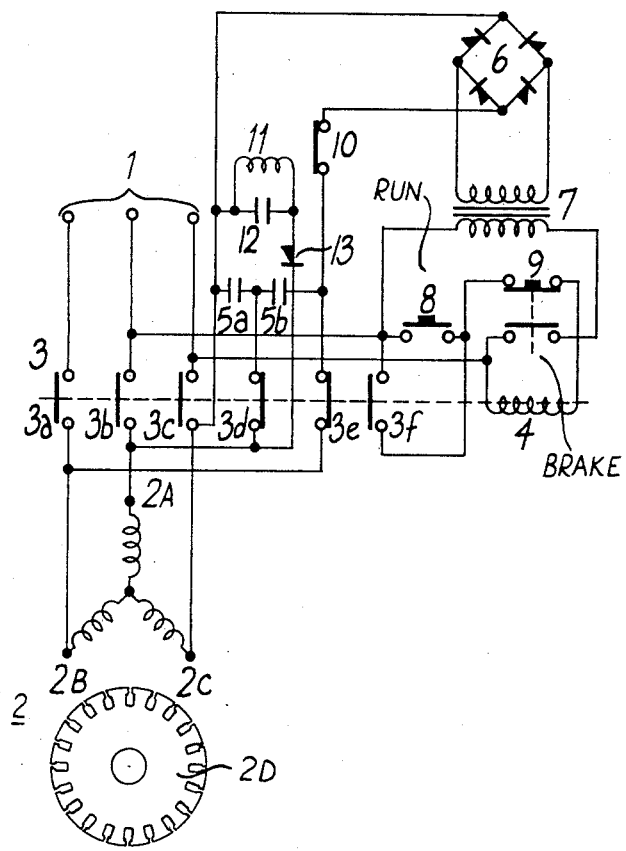
INVENTOR
SHAFI-UDDIN AHMED CHOUDHURY
ATTORNEY

United States Patent Office 2,929,977
Patented Mar. 22, 1960

2,929,977
DYNAMIC BRAKING OF INDUCTION MOTORS

Shafi-Uddin Ahmed Choudhury, Rugby, England, assignor to The British Thomson-Houston Company Limited, a British company Application September 26, 1958, Serial No. 763,494

Claims priority, application Great Britain October 4, 1957

4 Claims. (Cl. 318—212)

This invention relates to the application of dynamic braking to an induction motor, and provides an arrangement for dynamic braking which is particularly applicable when it is required to bring the motor to rest in a short period of time.

It has been proposed to apply dynamic braking to an induction motor by connecting to the primary winding of the motor, when the A.C. supply has been disconnected therefrom, a capacitor previously charged by connection to the A.C. supply through a rectifier.

According to the present invention a three-phase induction motor is subjected to dynamic braking after the A.C. supply has been disconnected from the primary winding by connecting a capacitor between two of the phase terminals of the motor, and supplying a direct current excitation to two terminals of the primary winding between which the capacitor is not connected after a time delay sufficient for the speed of the motor to have been reduced by the effect of the capacitor. Two capacitors, instead of one, may, if desired, be connected between two different pairs of phase terminals of the motor.

Although the connection of the capacitor(s) to the phase terminals permits of the circulation of current in the windings as a result of self-excitation by virtue of the still rotating secondary winding, the, or each, capacitor is not subjected to prior charging from the supply in order to produce a voltage thereon which injects current into the windings when the capacitor is connected thereto. There may, of course, be some charge remaining on the capacitor(s) as a result of a previous braking operation, but this is fortuitous.

The time delay required for initiating the supply of D.C. to the terminals of the primary winding may be obtained by including in the circuit through which the direct current is supplied the contacts of the relay which is energised when dynamic braking is initiated, the relay being slugged to prevent its normally open contacts from closing immediately on its energisation. Alternatively, the normally closed contacts of the relay may be included in the circuit through which the direct current for braking is supplied, and the relay winding may be connected to two of the terminals of the primary winding of the motor so that it is energsed to open its contacts when the supply is switched on and also by the voltage of self-excitation induced in the primary windings by the rotation of the motor when the supply is disconnected from the windings, the energisation of the relay being subsequently reduced as the motor is dynamically braked by the connection to its windings of the capacitor.

The value of the capacitance should be comparable to the short circuit impedance of the machine but the value is not critical and large variations are permissible.

An arrangement in accordance with the invention is illustrated in the accompanying drawing, and shows two capacitors as being used for initial braking and the direct current for final braking is delayed automatically through a voltage relay.

Referring to the drawing, 1 represents a three-phase source of supply, 2 the induction motor to be controlled. Induction motor 2 has a primary winding on the stator with terminals 2A, 2B, 2C adapted to be connected to the respective phases of the source of supply, and a secondary member or rotor 2D, provided with a squirrel cage winding. For connecting the primary winding of the motor 2 to supply 1 there is provided switching means in the form of a contactor 3. Contactor 3 is provided with contacts 3a, 3b, and 3c and 3f which are opened when the contactor is in the de-energised position for braking and disconnecting the motor from the supply, and contacts 3d, 3e, which are then closed. The contactor 3 is provided with an operating coil 4 energisable from two of the phases of the source of supply when a control switch exemplified by "Run" push button 8 is pressed by way of the main upper contacts of an auxiliary control switch exemplified by "Brake" push button 9. The contacts of push button 8 are short-circuited when contactor 3 is operated to the closed position by the contact 3f of the contactor 3, which acts as a retaining contact to maintain the contactor closed. Capacitors 5a, 5b are connectable by way of contacts 3d, 3e between the respective terminals 2A, 2C and 2A, 2B of the primary winding of the motor 2 to provide dynamic braking by furnishing paths for the flow of current through the primary winding as a result of the self-excitation voltage developed in the primary windings by the continued rotation of the rotor member 2D when the supply is interrupted. Capacitors 5A, 5B should have a reactance comparable with the short-circuit impedance of the motor; but if a lower value of braking torque is required, only one of the capacitors needs to be employed.

To supply direct current to the primary windings of the motor for braking the rotor member and bringing it to rest, a rectifier 6, shown bridge-connected, is connectable by way of contacts 10 of a relay 11 and contacts 3e of contactor 3 across terminals 2B, 2C of the primary winding of the motor when the contactor opens. Alternating current is supplied to rectifier 6 from the secondary winding of a transformer 7 when its primary winding is connected to two of the phases of the source of supply 1 through the lower contacts of the "Brake" push button 9 when the latter is closed for braking. Transformer 7 is thus energised only when push button 9 is kept depressed. Relay contacts 10 are biased to the closed position; the operating coil of the relay 11 is, however, excited either from the voltage of the supply (when the motor is running), or by the self-excitation voltage developed across the capacitor 5a, to maintain contacts 10 open and thereby prevent the flow of direct current to the motor. The operating coil of relay 11 is fed through a half-wave rectifier 13 and is shunted by a smoothing capacitor 12, so that a large ratio may be obtained between the voltage required to maintain contacts 10 open, and the voltage at which the relay drops out to close contacts 10. Capacitor 12 may be dispensed with if a full-wave bridge-rectifier is used to supply rectified current to the coil of relay 11.

The operation is as follows:

When the "Run" push button 8 is pressed down, operating coil 4 of the contactor 3 is energised from two phases of the supply and the contactor closes and connects the primary windings of the motor to the source 1 for normal operation by way of contacts 3a, 3b, 3c. Contact 3f completes a holding circuit for the contactor by way of the main upper contacts of "Brake" push button 9. The coil of relay 11 is now energised by direct current obtained by rectification through rectifier 13 of current obtained from the same two phases to hold the contact 10 in the open position. When it is desired to bring the motor to rest, push button 9 is depressed and contactor 3 opens as a result of the interruption of the holding circuit for coil 4 at the main upper contacts of the "Brake" push button 9. The lower additional contacts of the "Brake" push button 9 now close to complete a circuit for energising the primary winding of transformer 7 from two of the phases of the source 1. Closure of contacts 3d and 3e connects the capacitors 5a and 5b across the terminals of two of the phases of the primary winding of the motor. Since the motor continues to run, self-excitation voltage builds up and produces dynamic braking, and at the same time maintaining the coil of relay 11 energised to keep the contact 10 open. As soon as the speed of the motor is reduced to a low value, the self-excitation voltage is also reduced and the energisation of the relay 11 becomes sufficient to maintain contact 10 open. The contact 10 closes so that direct current flows in the motor winding to complete the final stage of dynamic braking. After this, the push button 9 may be released to switch off the D.C. by interrupting, at the lower contacts of push button 9, the supply to the primary of the transformer 7 while two push buttons have been illustrated for controlling the operation of contactor 3, any other suitable control scheme may be used. The relay 10 is shown as being operated by rectified current in order to obtain a large ratio of operating voltage to dropout voltage. An A.C. operated relay with ballast resistor could equally well be used.

Through a relay responsive to the voltage induced in the primary winding by the still rotating secondary winding of the motor is shown for controlling the delayed application of D.C. for braking, any timer or other slugging device could be used to delay the closure of contacts 10 subsequent to the deenergisation of the contactor 3.

By the use of this invention, the value of the direct current required for braking need not be more than the full load A.C. current taken by the motor, which enables the number of operations to be considerably increased over the conventional methods of dynamic braking.

The arrangement of the invention is essential when the supply frequency is high, say from 200 to 300 cycles, as may be used for wood working machines where the speed of the motor can easily reach 18,000 r.p.m. As an example a 10 H.P. motor running at 18,000 r.p.m. which takes 180 secs. to stop when supply is switched off, may be stopped in 4½ secs. using the control scheme illustrated, and employing a value of direct current which is only 75% the full load current.

What I claim is:
1. An arrangement for applying dynamic braking to a three-phase induction motor having a three-phase primary winding and a secondary winding comprising a three-phase source of alternating current, a contactor having main and auxiliary contacts and an operating winding, said main contacts operating to connect said primary winding to said source of supply and to disconnect said primary winding from said source, capacitor means, means comprising said auxiliary contacts for connecting said capacitor means across said primary winding when said contactor is operated to open said main contacts, whereby to apply an initial stage of dynamic braking to said motor by reason of current flow through said capacitor means resulting from voltage induced in said primary winding by the continued rotation of said rotor, a transformer having primary and secondary windings, control switching means operable when closed to connect the primary winding of said transformer to two of the phases of said source of supply, a rectifier, circuit means connecting said rectifier to the secondary winding of said transformer, a relay having an operating winding and contacts, circuit means connecting said operating winding to the primary winding of said motor so that said operating winding is energised when said contactor is closed, and circuit means including the contacts of said relay and auxiliary contacts on said contactor for conducting the rectified output from said rectifier to said primary winding, the voltage generated in said primary winding by the continued rotation of said rotor operating to hold the contacts of said relay open until the voltage developed in said primary winding has been reduced to a predetermined value by the dynamic braking effect of said capacitor whereupon the contacts of said relay close to connect said rectifier to said primary winding, and to inject rectified current into said primary winding to bring said rotor to rest.

2. An arrangement as claimed in claim 1 and having control switching means for connecting the operating winding of said contactor to two of the phases of said source of supply to cause said contactor to close, auxiliary contacts on said contactor forming a short circuit across the contacts of said control switching means whereby to maintain said contactor in the closed position.

3. An arrangement as claimed in claim 2 and having auxiliary control switching means providing contacts in series with said control switching means and the operating winding of said contactor for controlling the holding circuit of said operating winding to initiate opening of said contactor.

4. An arrangement as claimed in claim 3, in which said auxiliary control switching means is provided with main and additional contacts, said main contacts being connected in series with said control switching means, and said additional contacts, when closed, on opening of said main contacts, connecting the primary winding of said transformer to said supply.

References Cited in the file of this patent
UNITED STATES PATENTS

| | | |
|---|---|---|
| 2,445,430 | Herchenroeder | July 20, 1948 |
| 2,779,906 | Adniansen | Jan. 29, 1957 |

FOREIGN PATENTS

| | | |
|---|---|---|
| 695,340 | Germany | Aug. 22, 1940 |
| 731,765 | Germany | Feb. 15, 1943 |